UNITED STATES PATENT OFFICE.

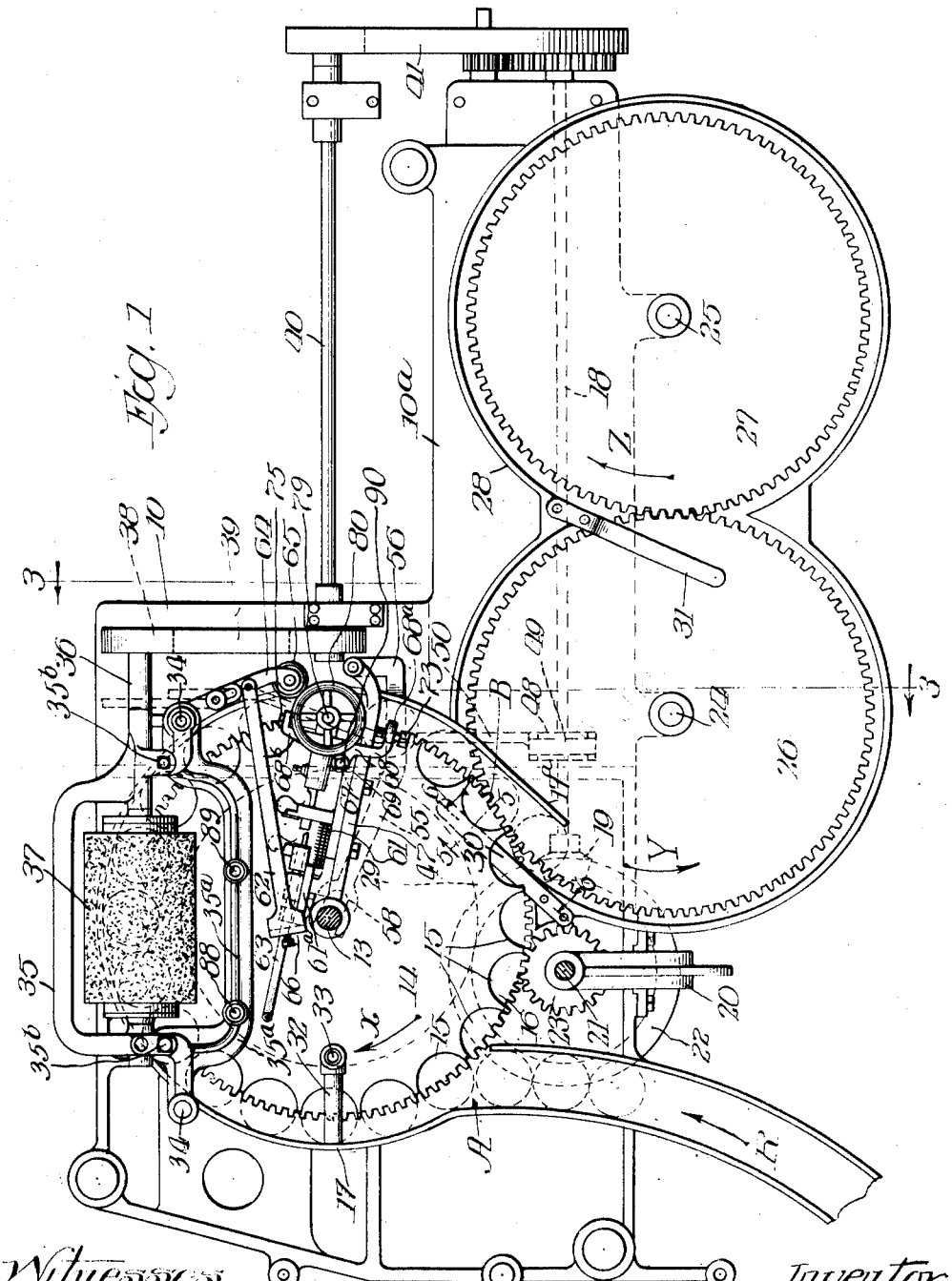

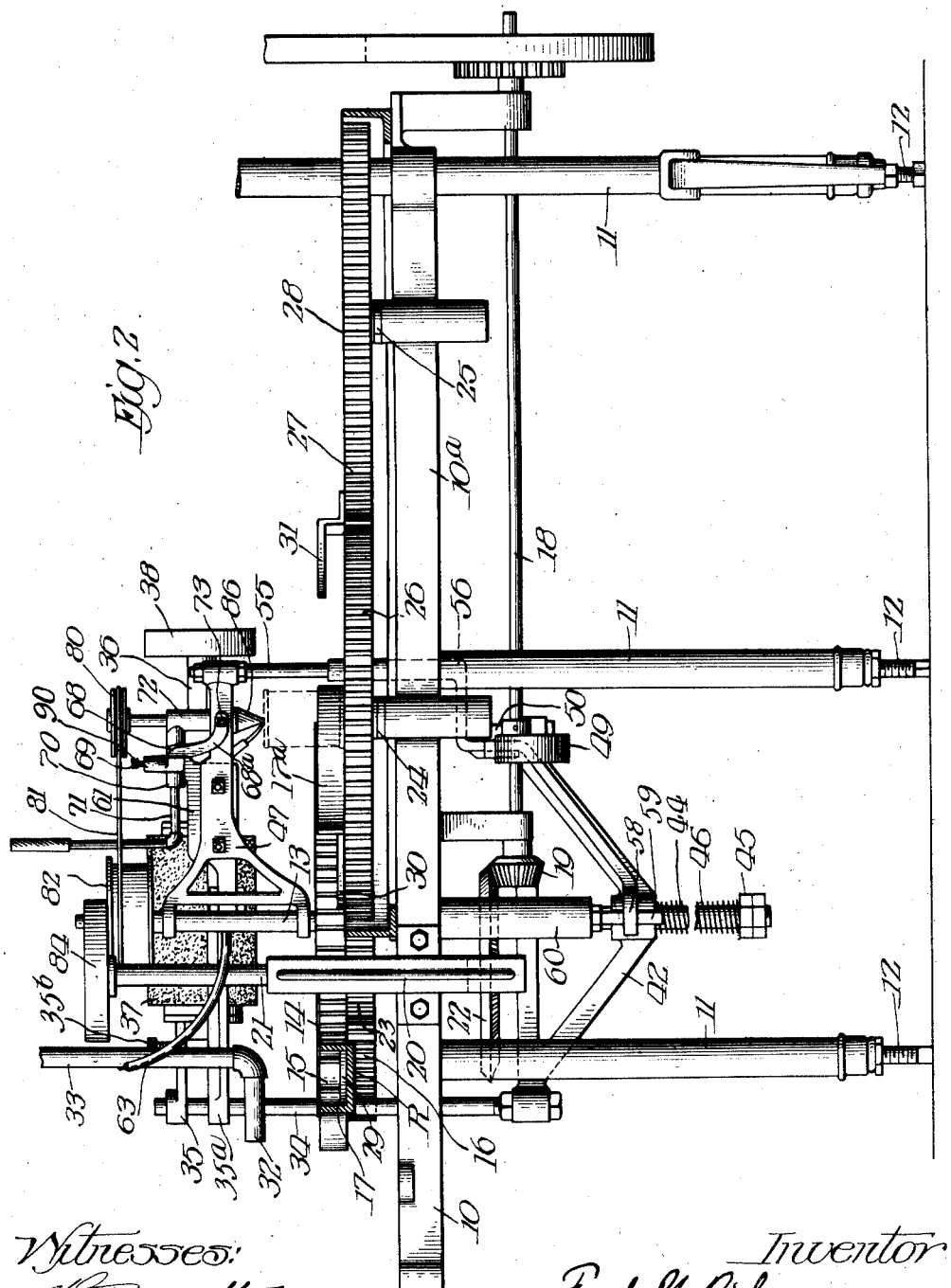

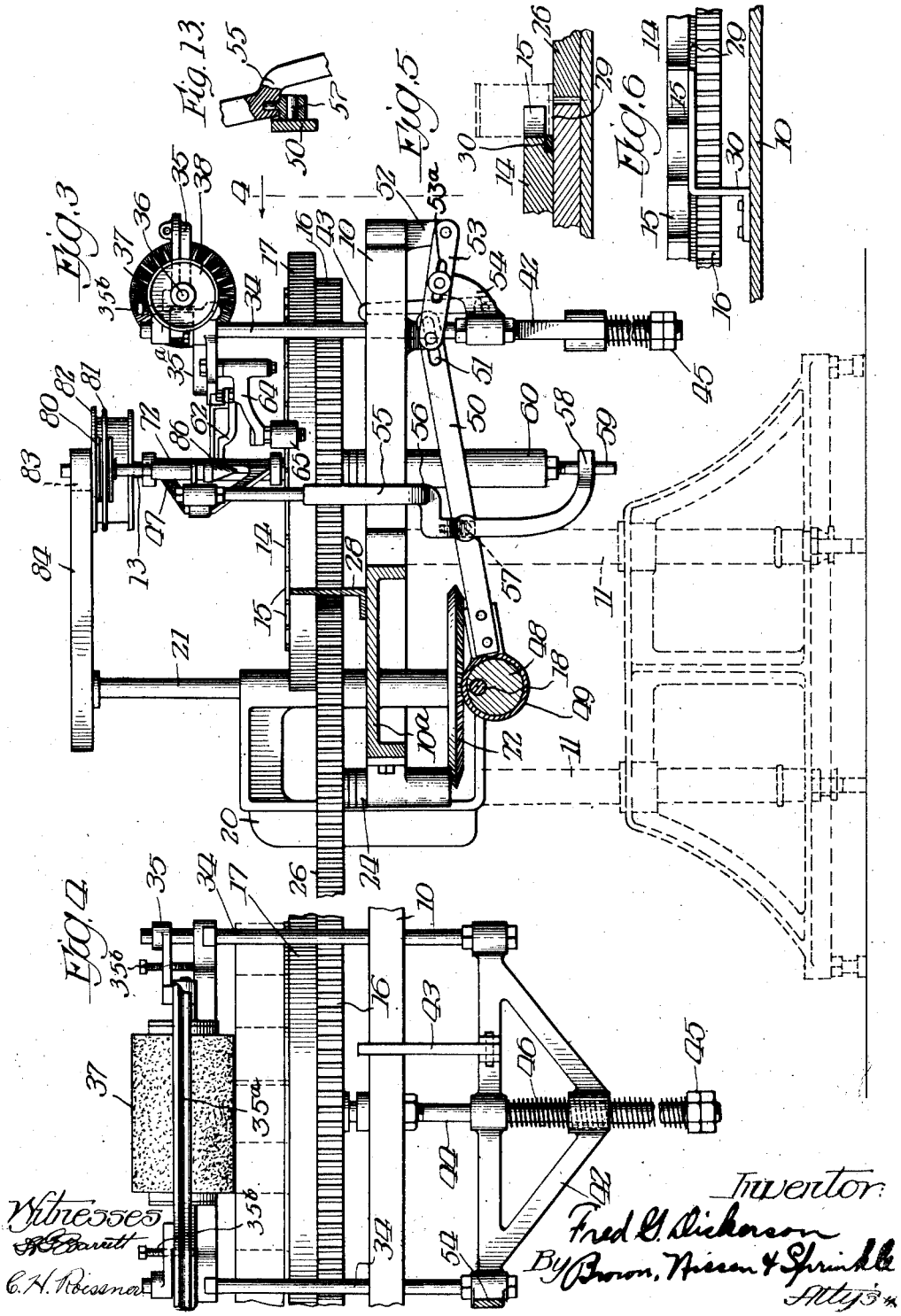

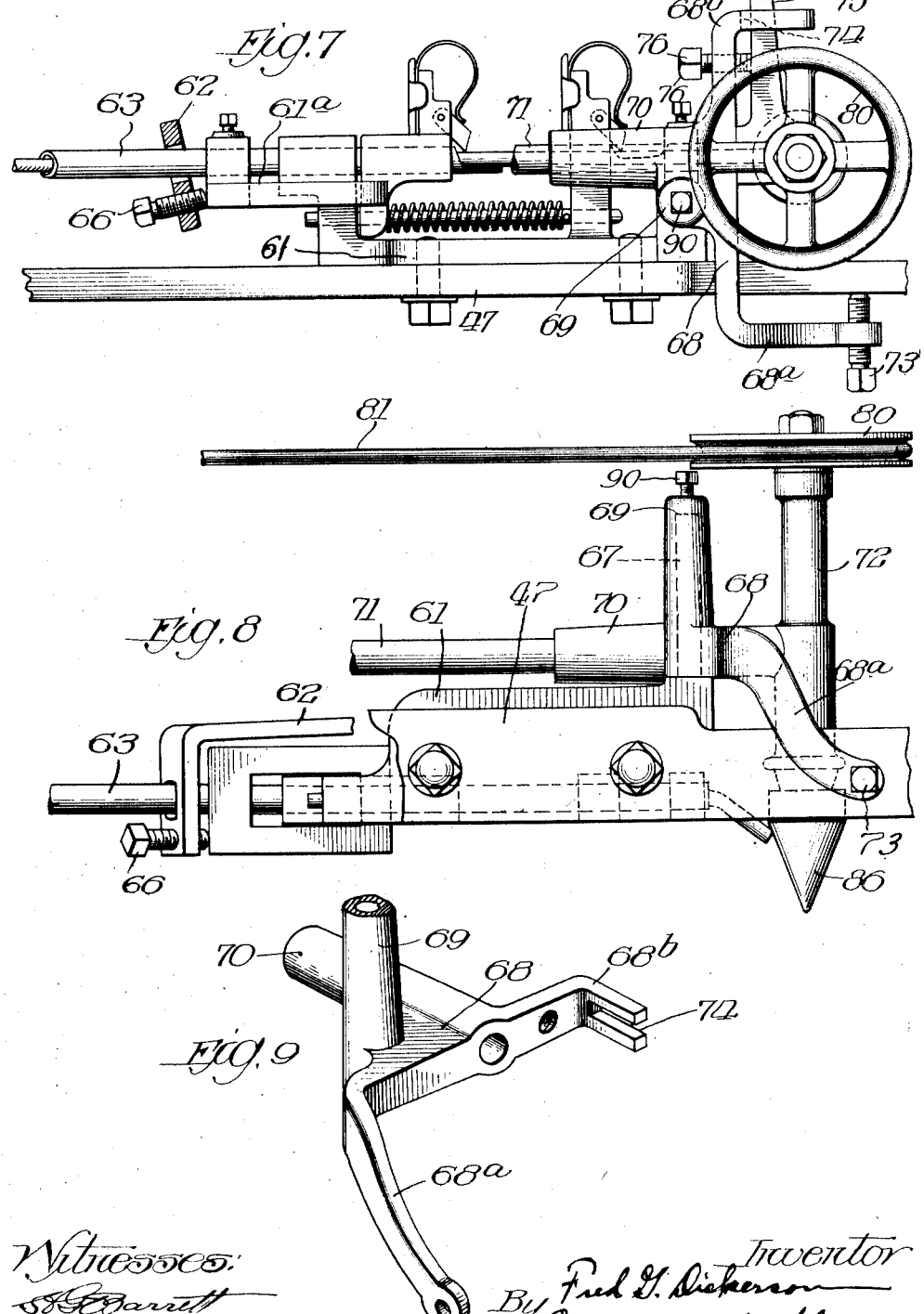

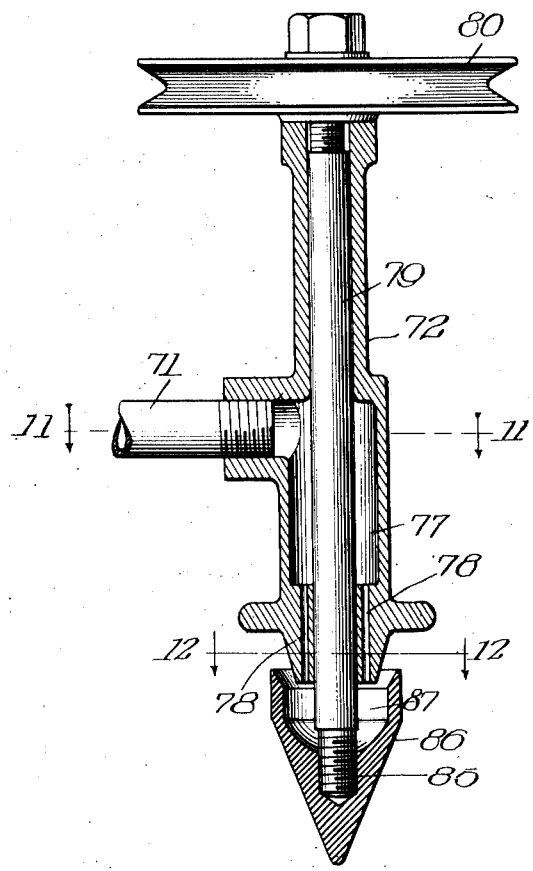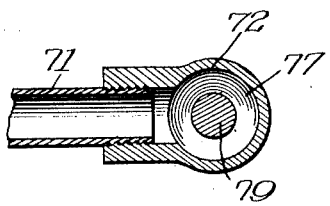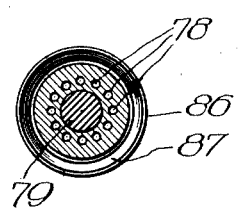

FRED G. DICKERSON, OF CHICAGO, ILLINOIS, ASSIGNOR TO THE F. G. DICKERSON COMPANY, OF PORTLAND, MAINE, A CORPORATION OF MAINE.

CAN-TIPPING MACHINE.

1,365,774.     Specification of Letters Patent.     Patented Jan. 18, 1921.

Application filed March 16, 1914, Serial No. 824,882. Renewed June 9, 1920. Serial No. 387,783.

*To all whom it may concern:*

Be it known that I, FRED G. DICKERSON, a citizen of the United States, residing at Chicago, in the county of Cook and State of Illinois, have invented certain new and useful Improvements in Can-Tipping Machines, of which the following is a specification.

This invention relates to new and useful improvements in a can tipping machine, and is particularly designed for use in coöperation with a filling machine adapted primarily to be used in connection with condensed or evaporated milks.

The present invention is designed to receive cans of various sizes from the filling machine, cleanse the same and tip the vent hole through which the can is filled, delivering the cans to the patching and inspecting tables.

With the above and other objects in view, this invention consists in the construction, combination and arrangement of parts all as hereinafter more fully described, claimed and illustrated in the accompanying drawings, wherein—

Figure 1 is a top plan view of the machine constructed in accordance with the present invention, parts thereof being shown in section;

Fig. 2 is a front elevation thereof, partly in section;

Fig. 3 is a section taken along the line 3—3 of Fig. 1, the patching table being shown in elevation;

Fig. 4 is a rear elevation of a portion of the machine and illustrates the cleaning brush and the means for adjusting the same;

Fig. 5 is a section taken along the line 5—5 of Fig. 1 through the feeding or carrying disk, and the geared table of the tipping machine, to illustrate the switching of the can from the tipping table or machine to the patching table;

Fig. 6 is a similar section taken along the line 6—6 of Fig. 1, and illustrates in elevation the switch for transferring the cans from the tipping table to the patching table;

Fig. 7 is a top plan view of the solder feed, illustrating the coöperation thereof with the soldering iron;

Fig. 8 is a side elevation of the solder feed and also illustrates the coöperation thereof with the soldering iron;

Fig. 9 is a detail perspective view of the yoke by which the soldering iron is carried;

Fig. 10 is a vertical longitudinal section of the soldering iron;

Fig. 11 is a horizontal section thereof taken along the line 11—11 of Fig. 10, and Fig. 12 is a similar view taken along the line 12—12 of Fig. 10, to illustrate the method of heating the soldering tip of the iron;

Fig. 13 is a detail of the universal joint between the solder mechanism and its operating pitman.

In the present machine, the cans are fed from the filling table to the tipping table, which is constantly rotating, and pass first under a spray of water, which washes such milk as may be accumulated on the exterior of the can around the vent hole. The cans then are passed under a rotary brush, adjustable vertically with respect to the cans to accommodate the various sizes, and also for the wear of the brush, where the water is wiped therefrom and the top of the can thoroughly cleansed. The can is then fed under the tipping mechanism, which includes a solder feed and a soldering iron, and there the vent hole is tipped and completely closed. The rotary movement of the tipping table then carries the cans from said table to the patching table, which is also constantly rotating to feed the cans to a constantly rotating inspecting table. It will be seen that as the cans leave the filling machine they are constantly moving through the machine constituting the subject-matter of the present invention, and at no time have their movement arrested.

Referring more particularly to the drawings, 10 indicates the frame supported by suitable legs 11, which are provided at their terminals with suitable bolts 12. The frame 10 is formed with an extension 10ª, upon which are mounted the patching and inspecting tables, as will be hereinafter more fully described. A shaft 13 is mounted in the frame 10, and carries a can feeding or carrying disk 14 which is provided with semi-circular cam seats or notches 15 in the periphery thereof for the reception and retaining of the cans. This carrying or feeding disk 14 rests above or upon a large geared table 16 and rotates therewith. The body of this geared table constitutes the rests for the cans carried by said disk. A band 17 encircles the greater portion of the periphery of the disk 14, to-wit, from the tangential point thereof where the cans are fed thereto to a similar point where the cans leave said disk to pass to the patching table. The cans are fed from a filling machine, which can be mounted upon the same framework as the present invention, in the direction of the arrow in Fig. 1, and are engaged by said feeding or carrying disk at the tangential point thereof designated A. It will be seen that as the geared table 16 is rotated, the disk 14 will rotate therewith and the cans being fed to the table will be engaged by the seats or notches 15 thereof at the point designated A and carried by said table to a tangential point in the path of movement thereof designated B, at which time they pass from said tipping table to the patching table. As the filling machine forms no part of the subject-matter of the present invention, the cans are shown as fed to the tipping table and disk 14 by a runway R.

In order to impart the necessary rotary movement to the disk 14 and the geared table 16, a drive or power shaft 18 is mounted on the frame of the machine and is provided at its inner terminal with a bevel gear 19. A yoke 20 is mounted upon the frame 10 of the machine and carries a vertical shaft 21, which at its lower terminal is provided with the bevel gear 22, meshing with the bevel gear 19 of the drive or power shaft 18. This shaft 21 also has a gear 23 keyed thereto which meshes with the geared table 16 for the operation of the feeding or carrying disk 14. It is therefore apparent that as the shafts 18 and 21 are rotated, the tipping table through the medium of the geared table 16 and the gear 23 will be rotated in the direction of the arrow X, in Fig. 1, to carry the cans by constant movement from the tangential point A to the tangential point B of the table 14.

Mounted on the stub shafts 24, 25, of the extension 10ª of the frame 10 of the machine, are the patching tables 26 and 27, respectively. The peripheries of these tables are geared and intermeshing, so that the rotation of the patching table 26 will rotate the inspecting table 27 in the opposite direction, as indicated by the arrows on said tables in Fig. 1. The periphery of the patching table 26 meshes with the geared table 16 at the tangential point B thereof, so that as the geared table 16 and the feeding disk 14 rotate in the direction of the arrow X, the patching table 26 will be rotated in the opposite direction, to-wit, in the direction of the arrow Y in Fig. 1, and the inspecting table will be rotated in the same direction as the geared table 16 and disk 14, to-wit, in the direction of the arrow Z in Fig. 1. It will thus be seen that as the cans are passed from the feeding table they will be carried by the patching table to the tangential or meshing point between the patching and the inspecting tables, where they will be transferred to said inspecting table 27. A gear guard 28 encircles both the patching and the inspecting tables, except at the tangential point between the patching table 26 and the inspecting table 27, and at the tangential point between the patching table 26 and the geared table 16 and disk 14.

In order to provide means whereby the cans may be transferred from the feeding or carrying disk 14 to the patching table 26, the under portion of the disk is grooved, as at 29, for the reception of a switch 30, which extends into said groove and to the rear of the cans contained in the semi-circular can seats or notches 15 of the disk 14. As the tipping table rotates and the cans approach the switch 30, the latter will force the cans from the semi-circular seats or notches 15 toward an extension 17ª of the wall or band 17 adjacent to the tangential point B of the disk 14. Thus the rotation of the geared table 16 and disk 14 causes the cans, as they approach the tangential point B, to be forced from the notches or seats 15 and transferred onto the patching table 26. The cans are then carried by the patching table to the tangential point between said patching table and the inspecting table 27. A switch 31 is provided adjacent to the tangential point between the patching table and the inspecting table, which guides the cans over the tangential points aforesaid onto the inspection table 27. In the operation of the machine, the patching and inspecting tables are so located that the cans inspected can be immediately returned to the patching table for repairs if so desired, without delay.

When the cans leave the filling machine and pass to the geared table 16 and are received by the disk 14, there is a small quantity of milk accumulated about the vent holes of some of the cans which must be removed before the solder is applied for the purpose of tipping said vent holes. Therefore, it is necessary to thoroughly cleanse all cans passing to the tipping machine. For this purpose a spray 32 is provided, which throws a spray of water onto the tops of the cans just after their engagement by the disk 14, which thoroughly washes the tops of the cans. The spray delivers the water to the top of the cans at approximately an angle of 45°, which while it washes the milk from around the vent hole does not permit any of the water to enter the can. This spray is fed by a feed pipe 33 extending to any suitable source of supply.

After the cans leave the washing spray, it is necessary to wipe the tops of said cans, removing the water and any accumulated dirt therefrom. This is accomplished by a rotating brush located at the rear of the machine, which operates upon the tops of the cans and thoroughly wipes the same. This brush is adjustable vertically to accommodate the various sizes of cans which pass through the machine.

Mounted at the rear of the machine for reciprocation through the frame 10 thereof is a pair of rods 34, said rods resting in the same vertical plane. A yoke 35 is loosely and slidably mounted on the upper ends of these rods 34, and carries shaft 36, upon which is secured a wiper or brush 37, arranged to operate upon the tops of the cans passed thereunder. Rigidly and permanently secured to the rods 34, and below the yoke 35 is an intermediate or secondary yoke 35$^a$ arranged to adjustably support the primary yoke 35 by means of the bolts 35$^b$ which pierce and are threaded into the arms of said primary yoke 35, and rest upon and bear against the arms of the secondary or intermediate yoke 35$^a$. In this manner the yoke 35 in conjunction with yoke 35$^a$ not only provides a means for the vertical reciprocation of brush 37, but also an adjustment independent of the rods 34 for taking up the wear of the brush or wiper.

The rods 34, in combination with the bridge 42 and yoke 35$^a$, constitute a frame which carries the wiper, as will be hereinafter apparent.

The end of the shaft 36 is provided with a pulley 38 which is connected by a belt 39 to a shaft 40 driven by a belt 41 from the drive shaft 18. Thus it will be seen that when the machine is in operation to rotate the feeding and carrying disk 14, the patching table 26 and the inspecting table 27, the brush 37 will be constantly rotated over the tops of the cans carried by the geared table 16 and disk 14 to wipe the water, accumulated dirt and milk that may happen to be thereon, from the same.

Inasmuch as the cans which are operated upon by the machine are of various heights and sizes, it is necessary to move the brush to and from the geared table and disk. This is accomplished by a bridge 42 interposed between the lower terminals of the vertical rods 34 and rigidly secured thereto. The bridge 42, the rods 34 and the yoke 35$^a$ being rigidly secured together with the yoke 35 supported by the yoke 35$^a$ for movement therewith, constitute a unit which may be reciprocated as a whole to raise and lower the brush with respect to the cans. A hook 43 is pivoted to the bridge 42 and is arranged to engage the frame 10 of the machine to retain the bridge and consequently the rods 34 and yoke 35 in an elevated position. As heretofore described the yoke 35$^a$, the rods 34 and the bridge 42 act as a unit or in combination as a frame, and when acting as such, the yoke 35 and consequently the wiper 37 forms a part of the unit i. e.:—When the bridge 42 is raised or lowered manually the wiper 37 and its yoke 35 are correspondingly raised or lowered. This bodily adjustment makes it possible to position the wiper 37 to accommodate cans of various sizes, the wiper 37, the rods 34, the bridge 42, and the yokes 35 and 35$^a$ being lowered (as a unit) for small cans, and raised (as a unit) for large cans. When these elements are raised (as a unit) the hook 43 is provided to engage the frame 10 to maintain them in their elevated positions. The screws 35$^b$ are provided to regulate the space between the yokes 35 and 35$^a$ so that the wiper 37 may be adjusted independently of any movement on the part of the bridge, to take the wear thereof. As will be hereinafter described, the raising and lowering of the bridge 42 and its coöperating elements to position the wiper 37 to accommodate large and small cans, also similarly positions the tipping tool to likewise accommodate large or small cans. The normal rotary movement of the wiper 37 and the tipping action of the tipping tool is unaffected by this adjustment. The bridge 42 operates upon a guide rod 44, which is provided at its lower terminal with the stops 45, which support the bridge and associated parts when the same are in their lowered position. This guide rod 44 is encircled by a compression spring 46, which bears against the bridge 42 and is designed to relieve the shock when the hook is disengaged from the frame 10, by placing the spring under a compression which aids in raising the bridge when it is desired to elevate the same.

After the cans have been cleaned and have passed from under the brush 37, they operate the solder feed and are operated upon by the tipping mechanism, which constitutes the solder feed and a soldering iron. The shaft 13 about which the disk 14 revolves is extended and carries a bracket 47 at its upper terminal superposed above said disk 14. This bracket is loosely mounted upon the shaft 13 for vertical and oscillatory movement. This movement is imparted thereto indirectly by an eccentric 48 mounted upon the drive shaft 18, which is encircled by an eccentric band 49. A pitman 50 is secured to this eccentric band at one terminal and is slotted as at 51 at its opposite terminal. A bracket 52 is formed upon the frame 10 of the machine adjacent to the slotted terminal of the pitman 50, and has a lever 53 pivoted thereto which is connected to the pitman 50 through the medium of the pin and slot connection 51. This lever 53 is also pivoted medially of its length, by means of a slot 53$^a$ in said lever, to a bracket 54 formed on the bridge 42. The free terminal of the bracket 47 is connected to a vertical link 55, which is offset inwardly as at 56 to extend under the frame of the machine, where it is pivoted by a universal joint to the pitman 50 medial of the length of said pitman, as at 57. The lower terminal of the link 55 is bent inwardly and bifurcated at 58 to span and engage an extension 59 of a casing 60 surrounding the shaft 13.

It will be seen that as the shaft 18 and the eccentric 48 rotate, the pitman is given a vertical and reciprocatory movement which is imparted to the link 55 and the bracket 47, causing said bracket to oscillate about and reciprocate on the shaft 13. The connection between the lever 53 and the bridge 42 through the medium of the bracket 54 is such that as the bridge 42 is raised and lowered to regulate the position of the brush 37 with respect to the cans, the pitman 50 will likewise be raised and lowered, imparting this motion to the bracket 47, raising and lowering said bracket to correspond to the adjustment of the brush 37. It is to be understood that this adjustment of the brush or wipers 37 and the bracket 47 and therefore the soldering iron carried thereby, is independent of the oscillation and reciprocation of the bracket 47 upon the shaft 13, and is provided in order that the machine may be made to accommodate cans of various heights.

From the foregoing it is clear that as the eccentric 48 rotates the pitman 50 will be reciprocated and oscillated vertically about the pin and slot connection 51 with the lever 53, the latter remaining fixed. This action oscillates the bracket 47 upon the shaft 18 as well as reciprocates it vertically, to bring the tipping tool (to be described) carried thereby into and out of engagement with the cans passing thereunder in order to tip the latter. This movement does not affect the bridge 42 or any of its coöperating elements, all of which remain stationary with the exception of the wiper 37 which has a rotary movement only. The normal movement of the bracket 47 may be said to be about a fixed initial position, which initial position is changed to accommodate cans of various sizes. In the drawing the bridge 42 and its coöperating parts are held elevated by the hook 43 for operation on large cans; when the hook is disengaged from the frame 10 the bridge 42 by its own weight moves downwardly along the rod 44, swinging the lever 53 about its pivot on the fixed bracket 52, hence lowering the link 55 and bracket 47 through the medium of the pitman 50 to a new initial position. These lowered positions of the parts set the elements for operation upon small cans, the initial position of the pitman 50, link 55, and bracket 47 as well as the bridge 42 and associated elements remaining fixed until changed to compensate for a change in the size of the cans operated upon. The raising of the bridge 42 reverses the movements aforesaid and sets the elements in the positions shown in the drawing. After being set in either their raised or lowered positions, the operation of the pitman 50, link 55 and bracket 47 continues as described. When once set the bridge 42 and its associated parts do not change their positions while operating on a single can size.

The soldering mechanism is carried by the bracket 47 and constitutes a solder feed 61 of any suitable construction, which in the form illustrated embodies a reciprocatory member 61$^a$, which upon the reciprocation thereof feeds the solder to the soldering iron. This reciprocatory member 61$^a$ is reciprocated by a link 62, which is guided by the solder feed tube 63. The opposite terminal of the feed link 62 is connected to an oscillatory lever 64 pivoted to a portion of the yoke 35 carrying the brush 37. This lever is provided with an anti-friction roller 65, which bears against the cans carried by the tipping table 14. As each can contacts with the roller 65, the lever 64 is oscillated, creating a pull upon the feed link 62, which is imparted to the reciprocatory member 61$^a$ of the solder feed. Thus each can regulates the feed of the solder for the tipping of the vent hole thereof. A screw 66 pierces the end of the feed link 62 and rests against the reciprocatory member 61$^a$ of the feed 61, and is provided for adjusting purposes.

The solder feed 61 is provided with a vertical pin or projection 67, upon which is mounted a yoke 68, through the medium of a vertical tubular extension 69 formed thereon, which incases said pin or projection 67. This yoke is provided with the tubular horizontal extension 70 through which the gas feed pipe 71 of the soldering iron extends, the free terminal of said pipe being threaded into the cylinder 72, which constitutes the body portion of the soldering iron (see Figs. 10 and 11) and the opposite end of said pipe 71 being connected to a flexible supply pipe (not shown). This tube feeds the gas to the soldering iron, through the medium of which this soldering iron is heated. One arm 68$^a$ of the yoke 68 is bent downwardly and rests adjacent to the body of the bracket 47, and is pierced by a set screw 73, which is provided for the adjustment of said yoke about its pivotal point to aid in the alining of the soldering point with the vent hole of the can. The opposite arm 68$^b$ of the yoke 68 is bifurcated as at 74, to receive a projection 75 formed on the cylinder or body portion 72 of the soldering tool or iron. A set screw 76 pierces the arm 68$^b$ and bears against the projection or arm 75 upon the body or cylinder 72 of the soldering iron. By the provision of the set screw 76 in the yoke 68 the iron 72 may be adjusted to and from said yoke to accurately aline it with the vent holes of the cans to be operated upon; such adjustment sliding the pipe 71 longitudinally of the tubular extension 70 of the said yoke. The provision of the set screw 73 creates an adjustment for swinging the yoke 68 about the pin or projection 67, to further adjust the iron 72 with respect to the cans to be operated upon. Therefore the set screws 73 and 76 in combination provide for a multiple adjustment of the soldering iron with respect to the can feeding mechanism, whereby the soldering point may be accurately alined with the vent hole of the can, and at the same time aid in holding said solder tool in its adjusted position. The upper terminal of the tubular extension 69 of the yoke 68 is interiorly threaded and provided with a set screw 90, which bears against the upper terminal of the pin or projection 67 and provides means whereby the yoke and the soldering iron carried thereby may be raised and lowered.

The soldering iron comprises the cylindrical body tool 72, which is provided with an enlargement 77 which constitutes a gas reservoir connected to the feed pipe 71. The lower end of the gas reservoir 77 is closed except for the perforations 78, whereby the gas is fed to the soldering point. A shaft 79 is rotatably mounted in the cylindrical body 72 and has a grooved pulley 80 secured to the upper terminal thereof. This grooved pulley is connected by an elastic belt 81 to a wide pulley 82 loosely mounted on the upper terminal of the shaft 13. This pulley 82 has a second pulley 83 secured thereto, which is connected by a belt 84 to a pulley keyed to the shaft 21. Thus as the shaft 21 rotates, such motion will be imparted by the belt 84 to the pulley 82 and thence through the belt 81 to the pulley 80 and to the shaft 79 of the soldering tool, whereby the soldering point is rotated, as will be hereinafter apparent. The lower terminal of the shaft 79 is threaded as at 85, and has a soldering point 86 removably mounted thereon. This soldering point has a heating cup 87 formed in the rear terminal thereof, which extends slightly over the terminal of the cylindrical body 72 of the tool. The perforations 78 from the gas reservoir 77 lead into this heating cup 87 and when the gas passing from the reservoir is lighted, the flame will be located entirely within this cup, and by the pressure of the gas be driven directly against the soldering point 86. It is manifest, therefore, that the soldering point is not only kept at a constant temperature, but by this construction the soldering point when it becomes worn or damaged in any way may be replaced by a new point without changing the entire tool. As the cans pass from the cleaning brush 37, they operate the solder feed 61, to bring a portion of solder adjacent to the heated soldering point 86. The solder feed and the soldering tool have an elliptical motion imparted thereto through the medium of the eccentric 48, the pitman 50, the link 55 and the bracket 47, which causes the solder to drop directly upon the vent hole of the can, and the tool to operate upon the solder to completely close said vent thereby. The rotary movement of the soldering tool also aids in completely closing the vent hole by the solder.

The yoke 35ª is tubular in formation and is divided into two sections: One section is connected with the air supply pipe 88 and is arranged to deliver air to the tops of the cans prior to their passage under the brush 37. The bottom surface of the yoke at this terminal thereof is perforated for the purpose of emitting the air in this section of the yoke. The opposite section of the yoke is connected with the gas supply pipe 89, which is arranged to deliver gas through perforations in the under side of the yoke to the tops of the cans after the same have passed from under the brush 37, which gas is ignited for the purpose of heating and thoroughly drying the tops of the cans. The air blast from the pipe 88 removes the greater part of the water located upon the tops of the cans prior to their being operated upon by the brush 37.

The belt 81 being elastic affords a line pull on the pulley 80, other than the rotary pull imparted to said pulley. This pulling action of belt 81 holds the projections or arm 75 against set screw 76 and thus retains the soldering iron in its adjusted positions.

What is claimed is:

1. The combination with a machine frame, of a plurality of rods mounted on said frame, a yoke slidably mounted on said rods, a wiper carried by said yoke, a second yoke fixed to said rods and means whereby said first yoke may be adjustably supported by said second yoke.

2. The combination with a machine frame, of a plurality of rods mounted on said frame, a yoke slidable on said rods, a wiper carried by said yoke, a second yoke fixed to said rods, and means whereby said first yoke may be adjustably supported by said second yoke, comprising set screws in said first yoke bearing against the arms of said second yoke.

3. The combination with a frame, of a plurality of rods mounted on said frame, a primary yoke mounted for adjustment on said rods, a rotary wiper carried by said yoke, a second supporting yoke secured to said rods, and means for adjustably supporting said primary yoke upon said secondary yoke.

4. The combination with a support, of a plurality of rods arranged to reciprocate with respect to said support, a bridge connecting the lower terminals of said rods, a guide rod upon which said bridge operates, a yoke mounted on said rods, and a rotary wiper carried by said yoke and adjustable to and from the support aforesaid by the movement of the rods.

5. The combination with a frame of a stationary guide rod secured thereto, a bridge mounted for reciprocation upon said guide rod, a plurality of supporting rods carried by said bridge, a wiper carried by said supporting rods, and means for retaining said bridge in any of a number of positions upon said guide rod.

6. The combination with a bracket, of a solder feed and a soldering tool carried thereby, a pitman arranged to oscillate said bracket, an adjustable frame, and means whereby the adjustment of said frame will move said pitman, thereby adjusting the bracket aforesaid.

7. The combination with a solder feed, of a soldering tool carried thereby, a bracket carrying said soldering feed, a pitman arranged to impart an oscillatory and reciprocatory movement to said bracket, a vertically adjustable frame, a cleaning element carried thereby, and a lever operated by the movement of said frame and connected to said pitman, whereby said pitman is moved to adjust the bracket aforesaid upon the adjustment of the frame.

8. The combination with a bracket reciprocatingly and oscillatingly mounted, a soldering tool coöperative therewith, a vertically movable frame, and means whereby the adjustment of said frame will simultaneously adjust said bracket.

9. The combination with a table, of a soldering tool adjustably superposed above said table, a wiper adjustably superposed above said table, and means whereby the adjustment of said wiper to and from said table will simultaneously and similarly adjust the soldering tool aforesaid.

10. The combination with a shaft, of a bracket reciprocatingly and oscillatingly mounted upon said shaft, a frame mounted for reciprocation relatively to said shaft, and a connection between said frame and said bracket whereby the movement of said frame will simultaneously adjust said bracket.

11. The combination with a shaft, of a bracket oscillatingly and reciprocatingly mounted on said shaft, a frame mounted for movement relatively to said shaft, a pitman, and connections between said pitman and said frame and bracket for the simultaneous adjustment of said bracket with the movement of said frame.

12. The combination with a shaft, of a bracket, mounted for adjustment thereon, a frame adjustable relatively to said shaft, a pitman, a link connecting said pitman to said bracket, and a connection between said pitman and said frame.

13. The combination with a reciprocatingly and oscillatingly mounted bracket, a soldering tool carried thereby for rotation, a link connected to said bracket, a drive shaft, a pitman mounted upon said drive shaft, universal joint between said pitman and said link, and means for moving said pitman independently of said drive shaft to bodily elevate or lower said bracket.

14. The combination with a support for articles, of a tool, a cleaning element, and means for simultaneously and bodily moving said tool and cleaning element from said support for the simultaneous and similar adjustment of both the tool and cleaning element.

15. The combination with a support, of a tool, a cleaning element, means for simultaneously and bodily moving said tool and cleaning element to and from said support, and means for independently adjusting said cleaning element to and from said support.

16. The combination with a frame, of a plurality of rods coöperating with said frame, a yoke freely slidable on said rods, a wiper carried by said yoke, and means for adjustably supporting said yoke on said rods.

17. The combination with a soldering tool, of a wiper, means for simultaneously and correspondingly adjusting said wiper and soldering tool, for changing the zone of operation thereof to compensate for changes in can size, and further means for independently adjusting said wiper to take up the wear thereof.

18. The combination with a frame of a machine, of a plurality of rods mounted for reciprocation relatively to said frame, a yoke adjustable on said rods, and a wiper carried thereby.

19. The combination with a frame of a machine, of a plurality of rods mounted for reciprocation relatively to said frame, a yoke slidable on and movable with said rods, a wiper carried by said yoke, and means for maintaining and supporting said yoke in adjusted positions on said rods.

20. The combination with a plurality of rods, a supporting element fixed to said rods, a yoke slidably positioned on said rods above said supporting element, and means interposed between said supporting element and said yoke whereby the latter may be adjustably supported by the former.

21. The combination with a support, of rods mounted for reciprocation through said support, a yoke mounted on said rod, a rotary brush carried by said yoke, and a bridge connecting the lower terminals of said rods.

22. The combination with a frame, of a plurality of rods mounted for a relative reciprocation to said frame, a permanent connection between the lower ends of said rods, a guide rod on said frame for coöperation with the said connection, and a tool adjustably carried at the upper ends of said rods.

23. The combination with a table, of a wiper superposed above said table, a yoke carrying said wiper, a plurality of rods mounted for movement relative to said table, a second yoke fixed to said rods, and means whereby the second yoke adjustably supports the first named yoke.

24. The combination with a table, of a wiper arranged to maintain a normally fixed position relative to said table, a carrier for said wiper, a plurality of rods, a supporting element carried by said rods, and adjustable means for supporting said carrier on said supporting element whereby the normal position of the wiper aforesaid may be adjusted.

25. The combination with a table, of a wiper arranged to maintain a normally fixed position relative to said table, a carrier for said wiper, reciprocable rods mounted adjacent to said table for movement in unison relative thereto, a supporting element carried by said rods, means for maintaining said rods in predetermined positions relative to said table, and means whereby said carrier may be adjustably supported by said supporting element.

26. The combination with a wiper, of a unitary frame carrying said wiper, comprising a plurality of reciprocable rods and fixed connections between said rods and means for adjustably supporting said wiper on one of the connections aforesaid.

27. The combination with a wiper, of a unitary frame carrying said wiper, comprising a plurality of reciprocable rods and fixed connections between said rods, means for adjustably supporting said wiper upon one of said connections, and means for maintaining said frame in any one of a number of positions.

28. The combination with a wiper, of a yoke carrying said wiper, a supporting yoke arranged for coöperation with the carrying yoke aforesaid, and means whereby the carrying yoke may be adjusted relatively to said supporting yoke.

29. The combination with a wiper, of a yoke carrying said wiper, a supporting yoke arranged for coöperations with the carrying yoke aforesaid, set screws operating through the arms of the carrying yoke and arranged to coöperate with the supporting yoke for adjusting the former relatively to the latter.

30. The combination with a frame, of a pair of rods slidably operating with said frame, a bridge permanently connecting the lower ends of said rods, a guide rod fixed to said frame, upon which the bridge aforesaid reciprocates, a stop at the lower terminal of said guide rod for supporting said bridge and said rods when at the lowest point of their movement, and means carried by said bridge for coöperation with said frame for maintaining the bridge and said rods elevated from the stop aforesaid.

31. The combination with a frame, of a pair of rods slidably operating with said frame, a bridge permanently connecting the lower ends of said rods, a guide rod fixed to said frame, upon which the bridge aforesaid reciprocates, a stop at the lower terminal of said guide rod for supporting said bridge and said rods when at the lowest point of thier movement, means carried by said bridge for coöperation with said frame for maintaining the bridge and said rods elevated from the stop aforesaid, and means on said guide rod for absorbing the shock when said bridge gravitates toward said stop and to aid in elevating said bridge.

32. The combination with a frame, of a pair of rods slidably operating with said frame, a bridge permanently connecting the lower ends of said rods, a guide rod fixed to said frame, upon which the bridge aforesaid reciprocates, a stop at the lower terminal of said guide rod for supporting said bridge and said rods when at the lowest point of their movement, and a guide spring on said guide rod above said stop, for absorbing the shock when the bridge aforesaid gravitates toward the stop and to aid in elevating said bridge.

33. The combination with a frame, of a pair of rods slidable relatively to said frame, connections between the corresponding terminals of said rods, a guide rod coöperating with one of said connections, a wiper, a carrier, aforesaid wiper coöperating with the other said connections, and means interposed between said connection and said carrier whereby said carrier and wiper may be bodily adjusted relatively to said connection.

34. The combination with a frame, of rods slidable relative thereto, permanent connections between the corresponding ends of said rods, a guide rod for one of said connections, a carrier coöperating with the other of said connections, a wiper mounted in said carrier, means whereby said carrier may be adjusted relative to its coöperating connection, and means carried by said connection operating on said guide rod for engagement with said frame to limit the slidable movement of the rods aforesaid.

35. The combination with a frame, of a pair of rods slidable relatively thereto, a connection between the lower ends of said rods, a guide rod for said connection, a fixed yoke connecting the upper terminals of said rods, a secondary yoke slidable on the upper terminals of said rods, set screws coöperating with said yokes for adjusting the secondary yoke relatively to the first named yoke, and a wiper carried by said secondary yoke.

36. The combination with a solder feed, of a yoke pivoted thereon having one arm thereof bifurcated, a tubular extension formed on said yoke, a tool carried by said yoke, through the medium of said tubular extension, a projection on said tool for coöperation with said bifurcated arm, and means carried by the yoke aforesaid for coöperation with said projection whereby said soldering tool may be adjusted with respect to the feed aforesaid.

37. The combination with a solder feed, of a stud carried by said feed, a yoke pivoted on said stud, said yoke being provided with a central tubular extension, a supply pipe extending through said tubular extension, and a soldering tool carried by said supply pipe.

38. The combination with a solder feed, of a stud adjacent thereto, a yoke pivoted on said stud, said yoke being provided with a central tubular extension, a supply pipe passing through said tubular extension, a soldering tool carried by said supply pipe, and means for adjusting said soldering tool with respect to the solder feed.

39. The combination with a solder feed, of a yoke pivotally mounted adjacent thereto, one arm of said yoke being provided with a set screw whereby said yoke is adjusted with respect to the solder feed, a soldering tool carried by said yoke, and means coöperating with the other arm of said yoke whereby said tool may be adjusted with respect to said feed.

40. The combination with a shaft, of a table rotatable thereon, a rotary tool coöperating with said shaft, a drive shaft for rotating said table, and means for rotating said tool from said drive shaft.

41. The combination with a rotary table, of a driven shaft, a connection between said driven shaft and said table, a soldering tool, means for imparting a rotary movement to said soldering tool from said driven shaft, and means for imparting bodily elliptical movement to said soldering tool.

42. The combination with a solder feed, of a yoke pivoted adjacent thereto, means for adjusting said yoke about its pivot, and a soldering tool carried by said yoke.

43. The combination with a solder feed, of a yoke pivoted adjacent thereto, means for adjusting said yoke about its pivot, a solder tool carried by said yoke, and means for adjusting said tool toward and away from the yoke aforesaid.

44. The combination with a solder feed capable of and having a continuous movement, of a tool carrier pivoted adjacent thereto and movable therewith, a tool mounted in said carrier, and means for adjusting the same relatively thereto.

45. The combination with a bracket, of solder feed secured thereto, a yoke pivotally mounted for adjustment relative to said solder feed, and a soldering iron carried by said yoke for adjustment to and from said yoke.

46. The combination with a bracket, of solder feed, an arm or projection extending adjacent to said feed, a yoke pivotally mounted on said arm or projection, one arm of said yoke being arranged to rest adjacent the bracket aforesaid, means of adjustment interposed between said arm and bracket, and a soldering iron carried by said yoke.

47. The combination with a solder feed, of an arm or projection adjacent thereto, a yoke pivoted on said arm or projection, a tubular extension on said yoke, supply pipe passing through said extension, a soldering iron carried by said supply pipe, and means for adjusting said yoke about its pivot.

48. The combination with a solder feed, of an arm or projection adjacent thereto, a yoke provided with an extension for the reciprocation on said arm or projection, one arm of said yoke being bifurcated, a soldering tool carried by said yoke, and a projection on said soldering tool arranged to be received in said bifurcated arm.

49. The combination with a bracket, of a solder feed carried thereby, an arm or projection on said solder feed, a tool carrier, a pivot connection between said tool carrier and said arm or projection, a tubular extension on said carrier, a supply pipe passing through said extension, a tool secured to the terminal of said supply pipe, and a set screw operating through said carrier for coöperation with the tool for moving the latter away from said carrier, sliding said supply pipe within said extension.

50. The combination with a solder feed, of a projection adjacent thereto, a tool carrier pivotally mounted on said projection, means for adjusting said tool carrier longitudinally of said projection, and a tool supported by said carrier and adjustable relatively thereto.

51. The combination with a support, of a tool carrier pivoted thereto, means for adjusting said carrier longitudinally of said support, a tool supported by said carrier, and means for adjusting said tool relatively to said carrier.

52. The combination with a support, of a tool carrier pivoted thereto, comprising two pivotally extending arms, a tool supported by said carrier, and means coöperating with one of said arms for adjusting said tool relatively to said carrier.

53. The combination with a support, of a tool carrier pivoted thereto, comprising two pivotally extending arms, a tool supported by said carrier, means coöperating with one of said arms for adjusting said tool relatively to said carrier, and means coöperating with the other of said arms for swinging said carrier and the tool about said support.

54. The combination with a support, of a yoke, a vertical tubular extension on said yoke for the reception of said support, a horizontal tubular extension carried by said yoke, a tool supported by said horizontal extension, means coöperating with one arm of said yoke for moving the tool relatively thereto, and means for coöperating with the remaining arm of said yoke for swinging the same about said support as a pivot.

55. The combination with a support, of a yoke embodying opposite the extending arms one of said arms being bifurcated, a tubular extension formed on said yoke and pivotally operating upon said support, a tool carried by said yoke, an arm on said tool projecting into the bifurcated arm of said yoke, and means operable through the arm of the yoke for coöperation with the arm of the tool, whereby said tool may be moved relatively to said yoke.

56. The combination with a yoke provided with a horizontal tubular extension and a vertical tubular extension, a support pivotally received within said vertical tubular extension, and means coöperating therewith for moving said extension longitudinally of said support.

57. The combination with a yoke provided with a horizontal tubular extension and a vertical tubular extension, of a support pivotally received within a vertical tubular extension, a pipe mounted for reciprocation in the horizontal tubular extension, a tool carried thereby, and means coöperating with said tool and said yoke whereby the pipe may be moved within said extension to adjust the tool relatively to said yoke.

58. The combination with a yoke provided with a horizontal tubular extension and a vertical tubular extension, of a support pivotally received within a vertical tubular extension, a pipe mounted for reciprocation in the horizontal tubular extension, a tool carried thereby, and an arm on said tool, a set screw operating in said yoke and bearing against the arm of said tool for moving the latter relatively to said yoke.

59. The combination with a movable bracket, of a movable solder feed carried thereby, a yoke pivoted adjacent to and adapted to move with said feed, a tool carried by said yoke, and means whereby said tool may be independently moved bodily relatively to said feed to adjust its point in a plane horizontal to the feed.

60. The combination with a bracket, of a solder feed carried thereby, a yoke pivoted adjacent to said feed, a tool carried by said yoke, means whereby said tool may be moved bodily relatively to said feed to adjust its point in a plane horizontal to the feed, and means for bodily moving said tool relative to the feed for adjusting its point in a plane vertical to the feed.

61. The combination with a cylinder, of a partition closing one end thereof, having a concentric series of perforations therein, a shaft extending through said cylinder and projecting beyond the partitioned end thereof, and a point removably mounted on the projecting end of said shaft, said point being provided with a heating or combustion cup for the reception of the partitioned end of said cylinder.

62. A soldering iron comprising a cylinder, a perforated closure at one terminal thereof, and a soldering point provided with a cup for the reception of the perforated terminal of said cylinder.

63. A soldering iron comprising a cylinder, a perforated closure at one terminal thereof, and a soldering point provided with a cup at its inner terminal arranged to receive and surround the perforated terminal of said cylinder.

64. The combination with a cylinder having an enlargement to constitute a fuel reservoir, of a partition closing the outer end of said enlargement, said partition having a series of perforations therein extending longitudinally of said cylinder, a shaft extending through said cylinder and arranged to be encircled by said perforations, said shaft having a bearing in said partition and said cylinder exclusive of the enlargement thereof, and a point carried by said shaft.

65. The combination with a cylinder, having an expanded portion constituing a fuel reservoir and a contraction constituting a bearing, a partition closing the outer end of said reservoir provided with a concentric series of perforations extending longitudinally of said cylinder, a shaft mounted in said contraction and projecting through said partition, said shaft being surrounded by the perforations aforesaid and a point removably secured to the projecting end of said shaft, said point having a cup to receive the adjacent end of the cylinder.

66. The combination with a drive shaft, of a tool, and independent means for simultaneously imparting a rotary and orbital movement to said tool from said drive shaft.

67. The combination with a table, of a rotating shaft adjacent thereto, gearing between said table and shaft for rotating the former from the latter, a fixed shaft about which said table rotates, a sheave loosely mounted on said fixed shaft, a belt extending from said sheave to said rotating shaft, and an adjustable tool adapted to be rotated from said sheave.

68. The combination with a table, of a rotating shaft adjacent thereto, gearing between said table and shaft for rotating the former from the latter, a fixed shaft about which said table rotates, a sheave loosely mounted on said fixed shaft, a belt extending from said sheave to said rotating shaft, a rotary soldering iron mounted for oscillatory movements and adjustments relative to said fixed shaft, and means for driving said iron from said sheave irrespective of its adjustments and movements.

69. The combination with a table, of a rotating shaft adjacent thereto, gearing between said table and shaft for rotating the former from the latter, a fixed shaft about which said table rotates, a sheave loosely mounted on said fixed shaft, a belt extending from said sheave to said rotating shaft, a rotary soldering iron mounted for oscillatory movements and adjustments relative to said fixed shaft, means for driving said iron from said sheave irrespective of its adjustments and movements, comprising an elongated pulley fixed to said sheave and geared to said iron by means of a belt.

70. The combination with a fixed shaft, of a soldering tool, carried by said shaft for movement relatively thereto, an elongated pulley loosely mounted on said fixed shaft, and a connection between said pulley and said tool whereby the former rotates the latter.

71. The combination with a fixed shaft, of a soldering tool, carried by said shaft for movement relatively thereto, an elongated pulley loosely mounted on said fixed shaft, and an elastic connection between the said pulley and tool whereby the rotation of the former rotates the latter.

72. The combination with a fixed shaft, of a soldering tool, carried by said shaft for movement relatively thereto, an elongated pulley loosely mounted on said fixed shaft, a connection between said pulley and said tool whereby the rotation of the former rotates the latter and means for rotating said pulley.

73. The combination with a bracket, of a supporting tube carried thereby, a rotating eccentric and a pitman connected to said eccentric, and a link pivoted to said pitman and connecting with said bracket whereby the bracket receives an oscillatory and vertical movement.

74. The combination with a bracket, of a rotating eccentric, a pitman connected to said eccentric having one end pivoted to a fixed pivot, and a link pivoted to said pitman whereby said bracket receives an oscillatory and vertically reciprocable movement therefrom.

75. The combination with a fixed shaft, of a bracket loosely mounted thereon, a link connected at one end to said bracket, and means for imparting a vertical and oscillatory movement to said link.

76. The combination with a pitman, an eccentric coöperating with one end thereof, a fixed pivot for the opposite end thereof, and means for changing the normal position of the pivot aforesaid.

77. The combination with a pitman, of an eccentric coöperating with one terminal thereof, an adjustable pivot for the opposite terminal thereof, said pivot being normally held against adjustment, a loosely mounted bracket connected to said pitman and adapted to receive a constant movement therefrom about a predetermined point, and means for changing the position of said pivot to change the point about which the bracket aforesaid operates.

78. The combination with a pitman, of an eccentric coöperating with one end thereof, a pivot for the opposite end thereof, a loosely mounted bracket, and a connection between said bracket and said pitman whereby the movement of the latter imparts an oscillatory, vertically reciprocable movement to the former.

79. The combination with a pitman, of means for imparting an oscillatory and reciprocable movement to said pitman, a pivot about which said pitman operates, a loosely mounted bracket, and a connection between said bracket and said pitman.

80. The combination with a pitman, of a pivot therefor, an eccentric coöperating therewith, a link pivoted to said pitman between said pivot and said eccentric, and a bracket connected to said link.

81. The combination with a frame, of a wiper frame mounted for movement relatively thereto, a soldering tool, a pitman for operating said tool, and a connection between said pitman and wiper frame whereby the adjustment of the latter changes the normal position of the wiper and simultaneously adjusts the soldering tool to occupy a corresponding position.

82. The combination with a movable wiper frame, arranged to maintain a normally fixed position, a soldering tool, a pivot, a pitman operable about said pivot for creating a normal zone movement for said soldering iron, and means whereby a change in the normal position of the wiper frame adjusts the pivot to create a corresponding change in the normal zone of movement of the soldering iron aforesaid.

83. The combination with a wiper frame, arranged to maintain a normal position, of a soldering iron adapted to maintain a normal zone of movement, and means whereby the adjustment of the wiper frame to change the normal position thereof adjusts the soldering iron to a corresponding zone of normal movement.

84. The combination with a wiper frame, of a soldering iron, a lever pivoted medially of said wiper frame, a fixed and stationary pivot for one end of said lever, a pitman pivotally connected to the opposite end of said lever, and a connection between said pitman and said soldering iron.

85. The combination with a bridge, of a lever pivoted medially of its length to said bridge, a fixed and stationary pivot for one end of said lever, a pitman connected to the opposite end of said lever by a pin and slot connection, and an eccentric coöperating with the opposite end of said pitman.

86. The combination with a bridge, of a lever pivoted medially of its length to said bridge, a fixed and stationary pivot for one end of said lever, a pitman connected to the opposite end of said lever by a pin and slot connection, a soldering iron, and a link coöperating with said soldering iron, and connected to the pitman midway of its length.

87. The combination with a frame, of a bracket carried thereby, a lever pivoted to said bracket, a bridge adapted to be moved relative to said frame, a pivoted connection between said lever and said bridge, a pitman likewise pivotally connected to said lever, an eccentric coöperating with said pitman to operate it about its pivotal point, a tool, and a connection between said tool and said pitman.

88. The combination with a drive shaft, of an eccentric mounted thereon, a pitman connected at one end to said eccentric, of a frame adapted to be moved, and a connection between said frame and said pitman whereby a movement of said frame changes the zone of operation thereof.

89. The combination with a drive shaft, of an eccentric mounted thereon, a pitman connected at one end to said eccentric, of a frame adapted to be moved, a connection between said frame and said pitman whereby the movement of the frame changes the zone of operation thereof, a link connected to said pitman, and a tool adapted to be operated by said pitman and link, the zone of operation of said tool being changed upon the change of the zone of operation of the pitman by the movement of the frame aforesaid.

90. The combination with a bodily movable frame, of a tool carried thereby, means for creating a normally orbital zone of operation for said tool by imparting such movement to the frame aforesaid, and means operating through the means of creating the orbital zone of operation for bodily adjusting said frame to change the orbital zone of operation of said tool.

91. The combination with a bodily movable frame, of a tool carried thereby, means for creating a normally orbital zone of operation for said tool by imparting such movement to said frame, and means operating through the means of creating the orbital zone of operation for bodily adjusting said frame independent of its orbital zone of operation for creating a new but similar zone of operation.

In testimony whereof I have signed my name to this specification, in the presence of two subscribing witnesses, on this 11th day of March, A. D. 1914.

FRED G. DICKERSON.

Witnesses:
CHARLES S. WILSON,
ALLENA OFFUTT.